(12) United States Patent
Rajkumar et al.

(10) Patent No.: US 8,037,004 B2
(45) Date of Patent: Oct. 11, 2011

(54) COMPUTER-IMPLEMENTED METHODS AND SYSTEMS FOR IDENTIFYING AND REPORTING DEVIATIONS FROM STANDARDS AND POLICIES FOR CONTRACTS, AGREEMENTS AND OTHER BUSINESS DOCUMENTS

(75) Inventors: Vijay Rajkumar, Redwood City, CA (US); Rhonda Stieber, Los Altos, CA (US); Ashok Srinivasaraghavan, Fremont, CA (US); Arun Kumar Sundaramoorthy, Cupertino, CA (US); Sanjay Kekkar, Mountain View, CA (US); John Kodlyan, Fremont, CA (US); Dayanand Patangey, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 767 days.

(21) Appl. No.: 11/761,338

(22) Filed: Jun. 11, 2007

(65) Prior Publication Data
US 2008/0306894 A1    Dec. 11, 2008

(51) Int. Cl.
G06F 17/00   (2006.01)
G06N 5/02    (2006.01)
(52) U.S. Cl. ............... 706/47; 706/45; 706/46; 706/50; 706/52; 706/62
(58) Field of Classification Search .............. 706/45–47, 706/50, 62; 707/607, 608, 917, 944, 945, 707/953, 954, 999.001, 999.002, 999.003
See application file for complete search history.

(56) References Cited

U.S. PATENT DOCUMENTS

| | | | |
|---|---|---|---|
| 4,799,156 | A | 1/1989 | Shavit et al. |
| 5,008,853 | A | 4/1991 | Bly et al. |
| 5,195,031 | A | 3/1993 | Ordish |
| 5,253,165 | A | 10/1993 | Leiseca et al. |
| 5,305,200 | A | 4/1994 | Hartheimer et al. |

(Continued)

FOREIGN PATENT DOCUMENTS
WO    WO97/04410    2/1997

OTHER PUBLICATIONS

Oracle, "Oracle Contract Core User Guide Release 11i", Aug. 2002, pp. 1-1 to 7-4.*

(Continued)

Primary Examiner — Omar Fernandez Rivas
(74) Attorney, Agent, or Firm — Kilpatrick Townsend & Stockton LLP (57) ABSTRACT

A computer-implemented method may include steps of providing a plurality of business document templates; providing a plurality of deviation rules and associating at least some of the plurality of deviation rules with each of the business document templates; storing the plurality of business document templates and the associated plurality of deviation rules; generating a business document (such as a contract, for example) based upon one of the stored plurality of business document templates, the generated business document including a plurality of clauses and business document terms; retrieving the plurality of deviation rules associated with the business document template upon which the business document is based and applying the retrieved plurality of deviation rules against the generated business document; identifying all business document terms of the business document that do not conform to one or more of the applied plurality of deviation rules, and generating a report that includes at least the identified non-conforming business document terms.

15 Claims, 6 Drawing Sheets

U.S. PATENT DOCUMENTS

| | | |
|---|---|---|
| 5,495,412 A | 2/1996 | Thiessen |
| 5,535,383 A | 7/1996 | Gower |
| 5,557,518 A | 9/1996 | Rosen |
| 5,629,982 A | 5/1997 | Micali |
| 5,664,115 A | 9/1997 | Fraser |
| 5,666,420 A | 9/1997 | Micali |
| 5,668,953 A | 9/1997 | Sloo |
| 5,671,279 A | 9/1997 | Elgamal |
| 5,677,955 A | 10/1997 | Doggett et al. |
| 5,692,206 A | 11/1997 | Shirley et al. |
| 5,715,314 A | 2/1998 | Payne et al. |
| 5,715,402 A | 2/1998 | Popolo |
| 5,717,989 A | 2/1998 | Tozzoli et al. |
| 5,732,400 A | 3/1998 | Mandler et al. |
| 5,757,917 A | 5/1998 | Rose et al. |
| 5,787,262 A | 7/1998 | Shakib et al. |
| 5,787,402 A | 7/1998 | Potter et al. |
| 5,790,677 A | 8/1998 | Fox et al. |
| 5,794,006 A | 8/1998 | Sanderman |
| 5,794,053 A | 8/1998 | Doris, Jr. et al. |
| 5,794,207 A | 8/1998 | Walker et al. |
| 5,794,212 A | 8/1998 | Mistr, Jr. |
| 5,802,497 A | 9/1998 | Manasse |
| 5,809,144 A | 9/1998 | Sirbu et al. |
| 5,815,665 A | 9/1998 | Teper et al. |
| 5,826,242 A | 10/1998 | Montulli |
| 5,826,244 A | 10/1998 | Huberman |
| 5,873,071 A | 2/1999 | Ferstenberg et al. |
| 5,895,450 A | 4/1999 | Sloo |
| 5,897,621 A | 4/1999 | Boesch et al. |
| 5,905,975 A | 5/1999 | Ausubel |
| 5,918,218 A | 6/1999 | Harris et al. |
| 5,924,082 A | 7/1999 | Silverman et al. |
| 5,941,947 A | 8/1999 | Brown et al. |
| 5,945,989 A | 8/1999 | Freishtat et al. |
| 5,950,177 A | 9/1999 | Lupien et al. |
| 5,961,601 A | 10/1999 | Iyengar |
| 5,963,923 A | 10/1999 | Garber |
| 5,996,076 A | 11/1999 | Rowney et al. |
| 6,014,643 A | 1/2000 | Minton |
| 6,029,171 A | 2/2000 | Smiga et al. |
| 6,035,288 A | 3/2000 | Solomon |
| 6,055,519 A | 4/2000 | Kennedy et al. |
| 6,067,528 A | 5/2000 | Breed et al. |
| 6,067,531 A * | 5/2000 | Hoyt et al. .................... 705/35 |
| 6,085,178 A | 7/2000 | Bigus et al. |
| 6,112,189 A | 8/2000 | Rickard et al. |
| 6,131,087 A | 10/2000 | Luke et al. |
| 6,141,653 A | 10/2000 | Conklin et al. |
| 6,182,055 B1 | 1/2001 | Kase et al. |
| 6,195,646 B1 | 2/2001 | Grosh et al. |
| 6,236,984 B1 | 5/2001 | Owens et al. |
| 6,332,129 B1 | 12/2001 | Walker et al. |
| 6,332,135 B1 | 12/2001 | Conklin et al. |
| 6,338,050 B1 | 1/2002 | Conklin et al. |
| 6,356,878 B1 | 3/2002 | Walker et al. |
| 6,401,080 B1 | 6/2002 | Bigus et al. |
| 6,418,415 B1 | 7/2002 | Walker et al. |
| 6,466,919 B1 | 10/2002 | Walker et al. |
| 6,510,418 B1 | 1/2003 | Case et al. |
| 6,553,346 B1 | 4/2003 | Walker et al. |
| 6,934,715 B2 | 8/2005 | Kalmes et al. |
| 7,016,859 B2 | 3/2006 | Whitesage |
| 7,028,047 B2 | 4/2006 | Boulmakoul et al. |
| 7,080,076 B1 | 7/2006 | Williamson et al. |
| 7,149,724 B1 | 12/2006 | Flanagan et al. |
| 7,162,458 B1 | 1/2007 | Flanagan et al. |
| 7,200,605 B2 * | 4/2007 | Baker ................................ 1/1 |
| 7,668,779 B2 * | 2/2010 | DeWitt et al. ................ 705/40 |
| 7,689,899 B2 * | 3/2010 | Leymaster et al. .......... 715/224 |
| 2002/0042782 A1* | 4/2002 | Albazz et al. ................. 705/80 |
| 2002/0058532 A1 | 5/2002 | Snelgrove et al. |
| 2002/0129056 A1 | 9/2002 | Conant |
| 2003/0074216 A1 | 4/2003 | Salle |
| 2003/0074633 A1 | 4/2003 | Boulmakoul |
| 2004/0019578 A1 | 1/2004 | Kalmes et al. |
| 2004/0230453 A1 | 11/2004 | Belmore |
| 2006/0235794 A1* | 10/2006 | Albazz et al. ................. 705/40 |
| 2006/0287954 A1* | 12/2006 | DeWitt et al. ................. 705/40 |
| 2006/0287966 A1 | 12/2006 | Srinivasaraghavan et al. |
| 2007/0239570 A1* | 10/2007 | Cheng et al. .................. 705/35 |

OTHER PUBLICATIONS

Oracle, "Oracle Sales Contracts", Apr. 2005, pp. 1-1 to Glossary-5.*
Oracle, "Oracle Sales Contracts 11i Data Sheet", 2004, pp. 1-6.*

* cited by examiner

| Rules | Questions | Contents |                                    Home | Library | Contract Expert |

Contract Expert: Rules >
CREATE RULE
___

* Indicates Required Field                          Cancel  Save   Apply   Apply And Add Another
                                                    ~348   ~350   ~352        ~354

* Rule Type: [Policy Deviation ▼] ~302
                                          Status  Draft ~310
* Name: [______] ~304                   * Intent: [Buy ▼] ~306

The "Name" and "Description" will be used to report
        deviations during document authoring
Description [________] ~308

CONDITIONS ~312

Condition Option: ⦿ Match All  ○ Match Any ~314
Show All Details | Hide All Details ~316

| Details | Type | Name | Operator | Value | Update Values | Remove |
|---------|------|------|----------|-------|---------------|--------|
| ~318    | ~320 | ~322 | ~324     | ~326  | ~328          | ~330   |
| + Show  | [▼]  | [__] | [🔦]     | [▼]   | ✎             | 🗑 |

[ Add Another Row ] ~332

CONTRACT TEMPLATE ASSIGNMENTS ~334

Apply To All Templates ~336  ☐
[ Add Template ] ~338

| Select | Contract Template Name | Description | Status |
|--------|------------------------|-------------|--------|
| ~340   | ~342                   | ~344        | ~346   |

FIG. 3

Contract Terms > Contract Expert >

PURCHASE ORDER 13401: CONTRACT DEVIATION SUMMARY

[ Cancel ] [ Back ] [ Finish ]

POLICY DEVIATIONS

| Deviation 412 | Description 414 | Doc. Line # 416 | Item 418 | Item Description 420 |
|---|---|---|---|---|
| Payment Terms Deviation 422 | Pymt Terms is NET-30, 30 or 60 | | | |
| Termination Term Deviation | Termination days deviation | | | |
| Liability Cap Deviation | Liability cap deviation | | | |
| Penalty Interest Deviation | Penalty interest deviation | | | |
| Additional Discounts | Add. Discount over Corp Standards | 10 | CM1319 | Hard Drive 400Gb |
| Additional Discounts | Add. Discount over Corp Standards | 13 | AS18947 | Sentinel Deluxe Desktop |
| Additional Discounts | Add. Discount over Corp Standards | 16 | Misc. | One Time Item |

FIG. 4

PURCHASE ORDER 13401: CONTRACT STANDARDS DEVIATIONS

Deviations Details

[Cancel] [Back] [Finish]

Deviation     Payment Terms Deviation Rule ~502

Description   Payment Terms must be NET 60, 45 or 30 if quantity ~504
              more than 1000 and discount more than 30%

CONDITIONS ~506

Match All Conditions
*Show All Details | Hide All Details*
~508

| Details | Name ~510 | Operator ~512 | Value ~514 | Document Value ~516 |
|---|---|---|---|---|
| + Show | Payment Terms | IS NOT | Net 30, Net 45, Net 60 | Net 90 |
| + Show | Item Discount Percentage | > | 30 | 40 |
| + Show | Line Quantity | >= | 1000 | 2000 |

Return to Contract Deviation Summary

COMPUTER-IMPLEMENTED METHODS AND SYSTEMS FOR IDENTIFYING AND REPORTING DEVIATIONS FROM STANDARDS AND POLICIES FOR CONTRACTS, AGREEMENTS AND OTHER BUSINESS DOCUMENTS

BACKGROUND OF THE INVENTION

1. Field of the Invention

Embodiments of the present invention relate to computer-implemented methods and systems for identifying and reporting deviations of business document terms in business documents from established policies that govern business documents between the enterprise and third parties, such as vendors, suppliers, partners or customers, for example.

2. Description of the Prior Art and Related Information

Conventionally, companies have many standard business documents that they use to define business relationships with their customers, vendors and partners. Most companies store these business documents (such as contracts, for example) as text documents on a file server. Some store hard copies in filing cabinets. To help define and enforce uniform standards across an enterprise and to effectively regulate the enterprise's dealings with its customers, vendors and partners, it is important to insure that the terms of the business document are compliant with pre-established corporate standards and policies, both to promote uniformity across its business document base and to insure that the business documents are not authored or modified on an ad-hoc basis by its procurement group, sales or marketing forces. Indeed, non-standard language and terms may expose a company to risk and have adverse financial impact especially in terms of revenue recognition. Recent regulations such as Sarbanes-Oxley have underscored the need to maintain more control on the contracting process, so that management is aware of non-standard contracts and their financial implications. For example, company ABC may enter into a contract that specifies that company ABC will supply a predetermined number of widgets and that the customer will pay for such widgets on a NET-30 basis. Such payment terms may be mandated by company ABC's corporate policy, with the intent of maintaining control over the company's outstanding receivables. Moreover, to mitigate risk, company ABC's policy concerning such contracts may further specify that any contracts where payments terms are specified to be different than Net 30 must be identified and that such deviations from corporate contract policy require special approval. Company ABC's policy may also specify that that sales discounts cannot be greater than 10% off list price. Therefore, if a sales person on company ABC's sales force were to negotiate a contract that binds company ABC to supply widgets at a 15% discount, payable on a NET-45 day basis, such a contract would significantly deviate from company ABC's established policy for such contracts by violating at least the aforementioned discount and payment terms provisions thereof.

Currently, companies handle such deviations from corporate policies with manual processes. Employees involved in the contracting process (sales representatives, buyers, contract administrators, etc.) must be well trained in corporate policies and contracting practices, and must manually review and identify any business terms or contract clauses that do not adhere to standards in some way. Moreover, evaluating business documents manually is a wholly subjective process, as it is based upon the reviewer's interpretation and understanding of the business document clauses. Such subjective evaluations, moreover, are not likely to be uniformly applied across all business documents (or even within a single business document) that cross the business document administrator's desk. In fact, such manual processes are very error prone and in many cases result in business documents that may be signed without fully considering or understanding the risks posed by deviations from the pre-established business document policies. Moreover, business documents that do not conform to the enterprise's established policies may negatively affect the enterprise's supply chain or collections and may expose the enterprise to unwanted or undue legal liability.

From the foregoing, it may be appreciated that improved methods and systems for identifying and reporting such deviations from established policies for contracts, legal agreements and other legally binding business documents are needed.

SUMMARY OF THE INVENTION

According to an embodiment thereof, the present invention is a computer-implemented method. The computer-implemented method may include steps of providing a plurality of business document templates; providing a plurality of deviation rules and associating at least some of the plurality of deviation rules with each of the business document templates; storing the plurality of business document templates and the associated plurality of deviation rules; generating a business document based upon one of the stored plurality of business document templates, the generated business document including a plurality of clauses and business document terms; retrieving the plurality of deviation rules that apply to the business document template upon which the business document is based and applying the retrieved plurality of deviation rules against the generated business document; identifying all business document terms of the business document that do not conform to one or more of the applied plurality of deviation rules, and generating a report that includes at least the identified non-conforming business document terms—that is, deviations based on negotiated business terms.

The generating step may be carried out with the report also including a listing of any of the applied plurality of policies that were violated by the identified non-conforming business document terms. The generating step may be carried out with the report also including a description of any of the applied plurality of deviation rules that were reported based on non-conforming business document terms. The generating step may be carried out with the report further including details regarding how at least one of the identified non-conforming business document terms failed to conform to at least one of the applied plurality of deviation rules. The generating step may be carried out with the report further including an identification of any clauses of the plurality of clauses of the generated business document that include the identified non-conforming business document terms. The applying step may be carried out with the plurality of deviation rules being configured to codify established policies of the enterprise for business documents. Each of plurality of deviation rules may be configured to evaluate at least one business term against predetermined standards. The method may also include a step of defining a new deviation rule, and associating the newly defined deviation rule with one or more of the plurality of business document templates. One or more of the plurality of deviation rules may define an allowed value, threshold or range of a variable or business term and the deviation rule(s) may identify a business term as non-conforming when the business term contains a value that is different than the allowed value, beyond the threshold or outside of the range, such as would occur when the business term deviates from the company standards and policies. One or more of the plurality of deviation rules may include one or more operators, such as, for example, IS, IS NOT, IN, NOT IN, >=, <=, >, <, = and ≠. Deviation rules may be based on conditions involving multiple business document terms and multiple operators. The generating step may be carried out with the report also including at least one line number in the business document where the non-conforming business term appears. A step may be carried out by requiring that identified non-conforming business document terms be brought into conformity before the business document is executed or is authorized to be executed. The method may also include a step of requiring that the business document that includes the non-conforming business document terms go through an approvals process before the business document is executed or is authorized to be executed. Each of the deviation rules may codify one of a plurality of predetermined business document standards of the enterprise. The generating step may be carried out with the business document being, for example, a contract, a proposal, a quote, an agreement, a memorandum, a license or a purchase order, or a request for proposal, request for information, among many other possibilities. One or more of the plurality of deviation rules may specify a list of approvers that must approve the business document before the business document is executed.

According to another embodiment thereof, the present invention is a machine-readable medium having data stored thereon representing sequences of instructions which, when executed by a computing device, causes the computing device to carry out steps of providing a plurality of business document templates; providing a plurality of deviation rules and applying at least some of the plurality of deviation rules with each of the business document templates; storing the plurality of business document templates and the applied plurality of deviation rules; generating a business document based upon one of the stored plurality of business document templates, the generated business document including a plurality of clauses and business document terms; retrieving the plurality of deviation rules associated with the business document template upon which the business document may be based and applying the retrieved plurality of deviation rules against the generated business document; identifying all business document terms of the business document that do not conform to one or more of the applied plurality of deviation rules, and generating a report that may include at least the identified non-conforming business document terms.

According to yet another embodiment, the present invention is a computer system, comprising: at least one processor; at least one data storage device coupled to at least one processor, and a plurality of processes spawned by said at least one processor. Such processes may include processing logic for providing a plurality of business document templates; providing a plurality of deviation rules and associating at least some of the plurality of deviation rules with each of the business document templates; storing the plurality of business document templates and the associated plurality of deviation rules; generating a business document based upon one of the stored plurality of business document templates, the generated business document including a plurality of clauses and business document terms; retrieving the plurality of deviation rules associated with the business document template upon which the business document may be based and applying the retrieved plurality of deviation rules against the generated business document; identifying all business document terms of the business document that do not conform to one or more of the applied plurality of deviation rules, and generating a report that may include at least the identified non-conforming business document terms.

BRIEF DESCRIPTION OF THE DRAWINGS

FIG. 4 shows an exemplary business document deviation report, according to an embodiment of the present invention.

DETAILED DESCRIPTION

Embodiments of the present invention may be deployed independently of or concurrently with the computer-implemented methods and systems disclosed in commonly assigned and co-pending U.S. patent application Ser. No. 11/020,605, filed Dec. 21, 2004, which application is hereby incorporated herein by reference in its entirety.

Definitions

Business document template: A business document template may include a document and/or a dynamic user-configurable tool for generating a business document such as, for example, a contract. Business document templates may include clauses and business term variables for which the user may input values and/or respond to questions to create a customized business document. A business document template may include a standard boilerplate business document, as defined by a company deploying an embodiment of the present invention. A business document template may include clauses defining company-mandated standard business document terms and conditions. A business document template may be formatted according to pre-established company printing requirements.

Standard business document terms or clauses: Standard business document terms or clauses may refer to enterprise-accepted standards and conditions that apply to and govern relationships (e.g., contractual relationships, licensor, licensee relationships) in the absence of customization of terms. A business document may include only standard business document terms or clauses or may include one or more standard terms or clauses that have been customized as a result of, for example, prior negotiations and/or customer requirements. A business document, therefore, may include standard business document terms or clauses, as well as customized (non-standard) business document terms or clauses.

Deviations: The term "deviations", within the context of embodiments of the present invention, refers to changes made to business document terms, conditions and/or clauses in a business document (such as a contract, for example) from the predetermined standards to such business document terms, conditions and/or clauses as established by the enterprise. Deviations may include business document terms of the business document that do not conform to the policy deviation rules set up by the organization.

Business Document Terms: Business document terms, according to embodiments of the present invention, includes information that may be negotiated on a business document such as payment terms, shipping terms, pricing, discounts or any other factor that may affect the rights and/or responsibilities of the parties or signatories to the underlying deal or undertaking memorialized by the business document. Business document terms may be captured in various ways on a business document. For instance on a purchase order, business document terms may be captured in the purchase order header or lines or distributions, or user-defined variables (or attributes) embedded in clauses used in the purchase order headers, lines or distributions.

Variables: Variables, a type of business term, are placeholders used in standard or non-standard clauses the values for which are sourced from the business document and can often be based on business negotiations with customers, suppliers or partners. When the business document is generated and/or printed, the placeholders are replaced with actual values from the business document. For instance, customer name and supplier name are examples of variables in business documents. The values of such variables (the actual name of the customer of the business document and the supplier of the subject of the business document) are substituted into the business document clauses when the business document is instantiated (e.g., generated). Additional examples of variables may include discounts, shipping terms, payment terms, and the like. Variables can be system variables or user defined. System variables are attributes on the business document (like Purchase Order) header, lines etc. User defined variables may be entered by the user authoring the business document.

Sales Representative A sales representative may create quotes by entering customer information, products and price. A sales representative may also negotiate business document terms, such as discounts and payment terms, to the extent that the customer is desirous of securing terms that are different than the standard terms for business documents of this type. The sales representative may not be involved in the business document terms of the business document from a legal perspective. Not all sales representatives may be empowered to create non-standard business document terms or materially modify standard clauses. If business document terms or clauses in addition to or instead of the standard business document terms or clauses are required or requested on a business document, this person may not have the knowledge or authority to choose which business document terms and/or clause(s) to add to the business document or which standard business document terms and/or clauses to modify to achieve the desired end result. Often, a Business Document Administrator (or contract administrator) may become involved in the negotiations when additional business document terms or clauses, or non-standard business document terms or clauses are required.

Buyers: Buyers typically create Request for Quotations, evaluate bids and award contracts to suppliers. Buyers may also negotiate business document terms, such as discounts and payment terms, including creating non-standard terms. If terms in addition to or in place of the standard terms or clauses are required on a business document such as a contract, the buyer may not possess the requisite knowledge or authority to choose which clause(s) or business document terms to add or to substitute into the business document.

Business Document Administrator/Negotiator/Manager: A business document administrator is a person who authors individual business documents, obtains approvals, negotiates with the external party and manages business document execution. The business document manager needs to follow enterprise (e.g., corporate) business standards and policies.

Customer: A customer may be defined as a person or entity that purchases products and/or services, from a sales representative, or directly on a web-storefront, for example.

Business Document, Contract: Within the context of this document, a contract may be defined as a written agreement or promise between two or more persons (any legal entities that may enter and be bound by a contract) which creates an obligation to do or not to do a particular thing. Within the context of the present document, the term 'business document' is understood to encompass any document (e.g., a legal document) whose content is subject to standards or policies of an enterprise, such as a corporation. Examples of such business documents may include contracts, proposals, quotes, agreements, memoranda, licenses, purchase orders, sales orders, settlements, requests for proposal, requests for information, and the like.

It is to be noted that these roles are fluid and not mutually exclusive. For example, in smaller enterprises, the business document administrator and the sales representative may have overlapping duties and may, in fact, be the same person.

Figure 1:
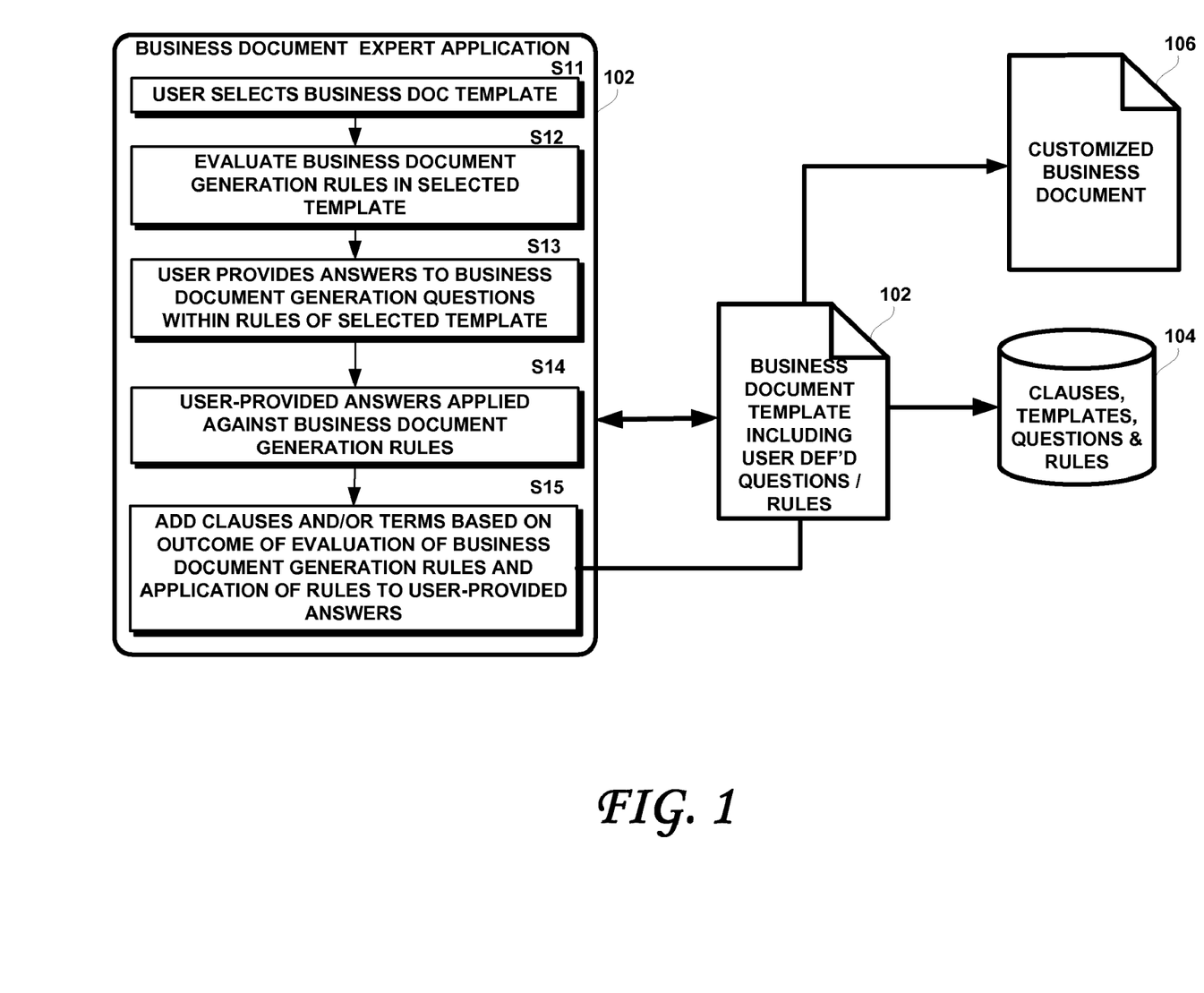
FIG. 1 shows a method of authoring customized business documents based upon selected business document templates.
Figure 2:
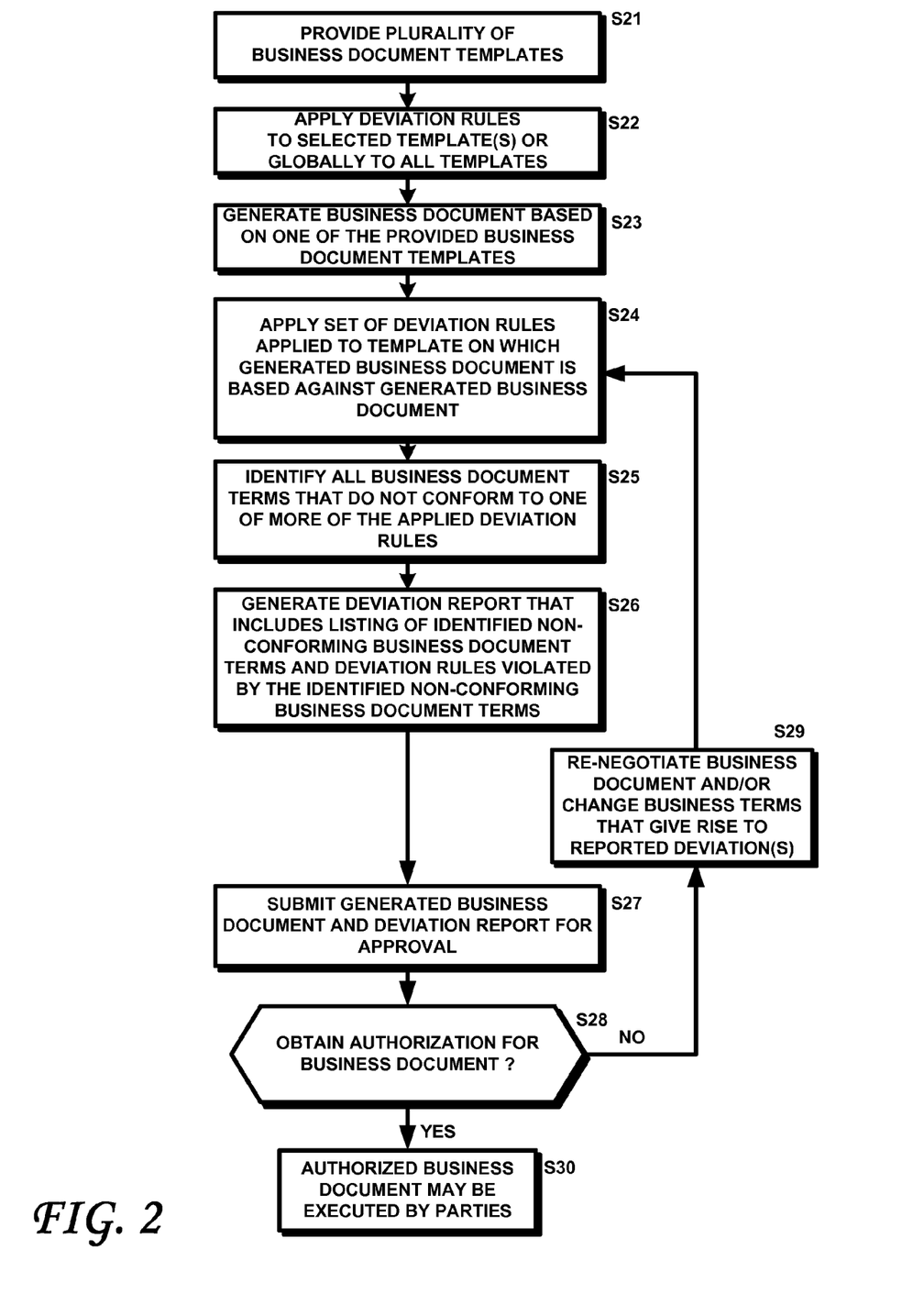
FIG. 2 shows a computer-implemented method for identifying and reporting deviations from an established policy or policies in business documents of an enterprise, according to an embodiment of the present invention.

Turning now to the drawings, FIG. 1 shows a method of authoring customized business documents based upon selected business document templates. Reference numeral 102 is a simplified flowchart of a computer implemented method of authoring business documents. Such a method is further described in the aforementioned co-pending application entitled "Methods And Systems For Authoring Customized Contracts Using Contract Templates That Include User-Configured Rules And Questions." It is to noted that embodiments of the present invention may be practiced in conjunction with the methods described therein or may be practiced independently thereof. As shown in FIG. 2, reference S11 calls for the user to select a business document template 102 from among a plurality of available business document templates. The selected business document template 102 may include a nearly fully-formed business document (requiring only values to be input for the customer name, price and quantity variables, for example). Alternatively, the selected template 102 may dictate, recommend or make available selected business document terms or clauses, depending upon the requirements of the business document, and the values and answers entered by the business documents administrator or sales representative when negotiating the specific business document terms and clauses of the business document (e.g., a contract). Indeed, the selected business document template 102 may include a plurality of business document generation rules that must be evaluated against answers to questions and/or required entries. Indeed, as shown at S12, the selected business document template 102 may evaluate a plurality of business document generation rules included in or pointed to by the business document template, for the purpose of selecting and/or completing the constituent clauses or terms of the business document. As shown at S13, the sales representative or business document administrator may then provide answers to the questions within the rules of the selected template 102 (e.g., "NET-30" in response to a question "What are the payment terms?") and/or provide any requested information. For example, the rules within the business document template 102 may request the customer name and dictate specific terms and/or clauses for business documents involving predetermined customers. For example, some customers may be entitled to or may have previously negotiated better credit terms or some other customers may be considered to be a relatively higher risk than others. The rules within the selected template 102 may then dictate inclusion of specific customer-specific clauses or terms or may, for example, force a substitution of NET-30 term for a user-entered NET-45 payment term.

In step S14, the user-provided answers and other information requested by the selected template 102 may be evaluated against the business document generation rules of the template. Step S15 calls for terms and clauses to be added based upon the provided answers and information. The terms and clauses to be added to or incorporated into the resulting business document may then be retrieved from a database 104 and the customized business document assembled and generated, as shown at 106. The questions and business document generation rules within the selected template (and the selected template itself) may be drawn from the same database 104 or from a different store altogether. A record of the clauses, business document terms and values of variables of the customized business document 106 may also be stored and utilized to evaluate whether the customized business document, according to embodiments of the present invention, conforms to establish corporate or enterprise standards and requirements for business documents of this type, as described fully hereunder.

FIG. 2 is a flowchart showing aspects of a computer-implemented method for identifying and reporting deviations from established standards in clauses of business documents of an enterprise, according to an embodiment of the present invention. As shown therein, step S21 calls for a plurality of business document templates to be provided, as discussed relative to FIG. 1 above. Step S22 requires a set of deviation rules to be applied with each template. Deviation rules may be applied to selected ones of the templates or may be globally applied to all templates. Just as each of the plurality of business document templates is crafted to generate a specific type of business document, so may be the deviation rules specific to one or more business document templates. Some deviation rules may apply to one business document template, whereas other deviation rules may have a broader applicability, as applying to more than one or indeed all of the business document templates. For example, some deviation rules may apply to one kind of product or service or may apply to one customer or class of customers, whereas other deviation rules may be agnostic to the product or service being sold or to the customer signing the business document in question. As discussed relative to FIG. 1, a customized business document may then be generated as called for by step S23, based upon a selected business document template and the answers and information (e.g., values of variables and questions) provided by the business document administrator or sales representative or other person or automated or semi-automated process authoring the business document.

As shown in step S24, the set of deviation rules that apply to the selected template that forms the basis of the generated customized business document may then be applied against the business document terms and/or clauses of the generated customized contract or other business document. As a result, as shown in step S25, all business document terms and/or clauses that do not conform to the corporate or enterprise standards (as codified by the applied deviation rules) may then be identified. That is, the present computer-implemented method may then flag or otherwise identify all business document terms and clauses that do not satisfy the deviation rules applied to the template used to generate the customized business document, as shown at S25. As called for at step S26, a business document deviation report may then be generated that may include a listing of or otherwise identify the non-conforming business document terms and/or clauses (a non-conforming clause may be defined as including any clause of a business document that includes one or more non-conforming business document terms). The generated report may also identify and/or list those deviation rules violated by the identified non-conforming business document terms and/or clauses, among other information, as detailed below.

As shown at Step S27, the buyer, business document administrator or sales representative (e.g., sales person) may then submit the customized business document and business document deviation report for approval according to established corporate or enterprise policy. The customized business document that includes such non-conforming business document terms or deviations, in some instances, may not be approved as shown at the No branch of S28. Alternatively, deviations raised in business documents may be configured so as to drive a list of approvers, the approval of whom is a precondition to the document being approved. For example, a business document may include a clause that states that pricing is 13%. A deviation rule may be applied against such a clause that states that if the pricing is >10%, a pricing deviation is raised and that such a deviation requires the approval from the sales representative's manager and the manager's manager. Therefore, deviation rules may be applied against clauses of business documents that define a list of approvers that must approve the raised deviation before the business document may be approved for execution. Returning to FIG. 2, at step S29, the sales representative may be required to re-negotiate the business document with the customer (or vendor or partner) and change the identified non-conforming terms and/or clauses of the customized business document. Alternatively, a contract with non-conforming business document terms may be submitted for approval and may be processed and finalized if such deviations are accorded approval. Thereafter, the method may revert back to step S24, whereupon the set of deviation rules applied to the template that gave rise to the underlying business document may again be applied to the re-negotiated and changed customized business document and the steps S25-S29 repeated as required. The customized business document may require modifications or approval from the business documents administrator (or a higher ranking member of the sales or managerial force) before such business document may be authorized to be executed (or otherwise disseminated or put into effect) by the parties to the transaction (e.g., the buyer and the seller of a contract) and legally bind the enterprise and the other parties to the underlying transaction. Appropriate safeguards may be put into place to prevent non-conforming business documents (e.g., business documents that include one or more non-conforming business document terms) from being executed. Indeed, the deviation report may be configured such that selected deviations in non-conforming business documents may drive a predetermined list of approvers, the approval of which being a precondition to authorizing the business document to be executed by the parties. For example, a deviation rule may state that if the business document includes a business term that is above or below a predetermined threshold, then the business document must be approved by approver A and approver B. For example, a deviation rule may state that if the business document includes a pricing business term >10%, the business document may be identified as containing a non-conforming business term and the business document requires the approval of the sales representative's manager and the manager's manager. Alternatively, the sales representative or business documents administrator may have the ability and authority to override any identified non conforming business document terms clauses in the generated customized business document and to allow business documents having one or more non-conforming clauses. It is to be noted that steps S27-S30 may vary from enterprise to enterprise, as each may have a predefined non-conforming business document approval methodology or automated workflow for handling such matters. Therefore, steps S27-S30 are shown in FIG. 2 for illustrative purposes only, with the understanding that all variations on such steps fall within the scope of the claimed and described embodiments.

When the deviation report is clean—that is, does not identify any business document terms and/or clauses that run afoul of the set of deviation rules applied to the template that gave rise to the customized business document—or the deviations on the deviations report receive the required approvals, then step S28 may proceed to the Yes branch. That is, whether the customized business document was re-negotiated and/or changed to conform to the established polices and standards of the enterprise (e.g., the deviation rules did not detect any non-conforming changes) or passed all criteria set out in the deviation rules at the outset, the authorized customized business document may be approved for execution by e.g., the business document administrator, with the confidence that the customized business document fully conforms to all of the enterprise's standards governing business documents of such type and/or includes a documented override of such standards.

For example, a customized business document may be generated in step S23 that contains the following "Claims" clause:

"If within sixty (60) days from the date the Indemnitor is notified in writing in reasonable detail of the amount and circumstances of a claim for indemnification, the Indemnitor has not contested a claim made by the Claimant, the Indemnitor will pay the full amount thereof in cash within ten (10) days after the expiration of the sixty (60) day period. (b) If a claim is brought by a third party and the Indemnitor agrees in writing that it is responsible to indemnify (fully and completely) the Claimant with respect to such claim then, (I) the Claimant shall give the Indemnitor (at the sole expense of the Indemnitor) full authority to defend, adjust, compromise or settle the action, suit, proceeding or demand as to which notice has been given (in the name of the Claimant or otherwise as the Indemnitor shall elect) and (ii) the Indemnitor shall not be liable for any legal or other expense thereafter incurred by the Claimant in connection with the defense, adjustment, compromise or settlement thereof. The Indemnitor shall not be liable for any settlement of any such action or claim effected without its consent. If the Indemnitor contests the claim, the Indemnitor shall undertake the defense, compromise or settlement of the claim in good faith, and shall be bound by the results of such defense, compromise or settlement"

This "Claims" clause may have been modified in such a way that the 'Claim Payment Days' business document terms was changed from the approved 10 day period to a longer period of 30 days. Such a change may trigger one of the deviation rules dealing with "Claims" clauses in business documents of this type (e.g., for this company, customer, industry, product, etc.) to report a business document rules deviation (such as shown in step S26 in FIG. 2). Such a non-conforming clause may be eventually approved, but the business document containing such a modified "Claims" clause may require prior authorization, as called for by step S28, as such a modified clause impacts the financial viability of the business document. Alternatively, a business document containing such a non-conforming business document term or clause may be rejected as being non-conforming, and the parties forced to re-negotiate all or some of the business document terms that triggered an identification of a clause or business document term of the business document as being non-conforming.

Embodiments of the present invention, therefore, may include an automated and rules-based approach for evaluating the clauses, conditions and business document terms of a generated and/or pre-existing business document against pre-established corporate or enterprise policies, as codified by sets of deviation rules. Such an automated and rules-based approach may be implemented in and by a computer application. Indeed, according to an embodiment thereof, the present invention may be embodied as a computer-implemented business document expert software application that provides an automated, rules-based approach for identifying business document terms in a business document that deviate from established policies or standards of the enterprise. A rules engine (a set of software programs that analyze, evaluate and execute rules) may, at runtime, evaluate the business document terms and clauses (if the business document contains clauses, which it may not) of the business document and may compare them to predetermined (e.g., pre-seeded in the application) deviation rules and/or to user-defined deviation rules. A business document deviation report may then be generated that lists deviations identified by the applied deviation rules, to a user-selectable degree of specificity. Such a computer-implemented method is applicable to all types of business documents in an enterprise, including buy-side and sell-side contracts and any other miscellaneous contracts and/or any other type of business document designed to regulate or define the respective rights and responsibilities of the parties to an agreement or other undertaking. Such a method may also be applied to other legally binding or important business documents generated by an enterprise, where such documents have standards that are amenable to codification and to rule-based deviation checking.

As alluded to above, deviation rules may be user-definable or user modifiable (although the attributes or conditions that users may utilize in defining the deviation rules may be pre-seeded in the application). For example, users could define a rule that states that Payment Terms must equal (or be better than) Net 30 and any other payment terms constitute a deviation. A single deviation rule may include multiple terms and/or conditions (the conditions may be evaluated with an 'AND' or 'OR'). For example, a deviation rule may define a complex condition and may be expressed as a complex condition of business terms values that cause the deviation (e.g., If contract amount is >$100K and payment terms not 'Net30 or Net15', then report a payment terms deviation). Users may be provided with the functionality to define as many deviation rules as required to encapsulate all the corporate business document standards. Deviation rules may refer to any attribute or term on a business document, or related to a business document. For example, deviation rules may be based on the business document customer (e.g. Company XYZ) or the customer's industry (e.g., all public sector customers or all customers in the civil aviation industry). Deviation rules may be based on many other attributes, including but not limited to business document type, items sold or procured, category of items sold or procured, business document dates (start date, expiration date), customer/vendor name, customer/vendor location, payment terms, freight terms, shipment method, discounts, quantities and order total. Deviation rules may also be based on responses to questions that are presented to the user during business document authoring. When the user defines a business document, he/she may be afforded the opportunity to run a business documents deviations report that identifies all deviations from corporate policies and standards. Alternatively, the business document deviation report according to embodiments of the present invention may be automatically generated at the conclusion of the business document authoring process, as called for by a workflow. The workflow may also specify, for example, that the business document deviation report is to be emailed or otherwise communicated to specified individuals or departments. A rules engine may evaluate all the relevant deviation rules based on the business document terms and conditions of the authored customized business document and determine the business document deviations, if any. In this manner, the business documents deviation report may identify any business document terms or clauses that may have or are suspected to have violated the applied deviation rules—and, therefore, the applicable standards or policies of the enterprise.

Figure 3:
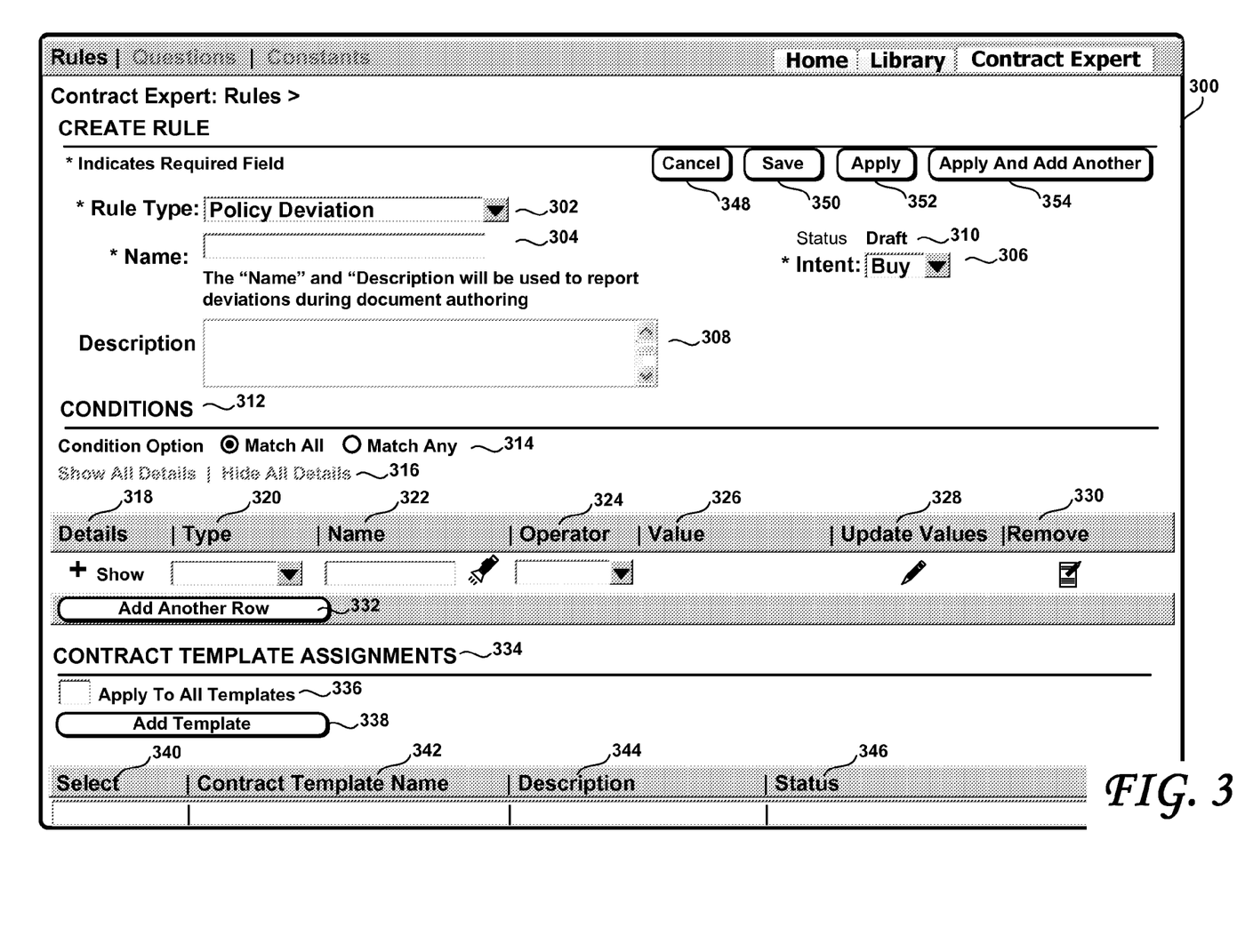
FIG. 3 shows a manner in which a policy deviation rule may be created by a user, according to an embodiment of the present invention.

FIG. 3 shows aspects of a method 300 for creating a user-defined policy deviation rule, according to an embodiment of the present invention. As shown at 302, the user may select the type of deviation rule he or she is creating. The deviation rule type may indicate the purpose for which the deviation rule is defined. The values for rule type may be pre-seeded and may include, for example, Clause Selection, which may be used to select relevant clauses for a business document or Policy Deviation (shown), which may be used to define standards for business document terms and clauses and to enable deviations to be reported. As suggested at 304, each deviation rule may be given a name to uniquely identify the rule being created. The unique name given to the deviation rule being created herein may also be reported in the business document deviation reports to be generated, if one or more of the business document terms or clauses of the business document triggers this rule. The Intent pull down 306 allows the user to identify the usage of the deviation rule being created; that is, whether the deviation rule is to be applied to "Buy" (shown) or "Sell" business documents. The Description text box 308 allows the user to enter a free-form text-based description of the rule being created. That is, the user may explain the nature and purpose of the rule—such as, for example, "Determines whether the authored contract conforms to the enterprise standard NET-45 day standard for payment for contracts of this type." The description entered at 308 may also be included in the business documents deviation report that may be generated at runtime.

Having defined a deviation rule, it should be next defined how such deviation rule is to be applied. As shown at 312 in FIG. 2, embodiments of the present invention allow users to enter conditions based on which the deviation rule should be evaluated. For instance, the 'Condition Option' 314 allows the user to select either 'Match All' or 'Match Any' by which the user may select whether the conditions for application of the deviation rule (to be defined below) must all evaluate to TRUE (or otherwise be satisfied) or whether only at least one of the conditions must evaluate to TRUE (or otherwise be satisfied) to trigger the deviation rule. The 'Details' field 318 may be configured to provide additional information about the other fields in the conditions table. The information provided when 'Show' is selected in the 'Show/Hide' Details columns 316 may include, for example, value/description pairs for variables and questions. For example, details of variables may include system-defined or user-defined variables, and a description of the variable. For example, NET-30 may be the value of a Net Payment Terms variable and a description thereof may be "Payment within 30 days of invoice required." The questions may be of the type requiring a Yes/No answer, in which case the value is either Yes or No, and the description thereof may simply be "Yes or No." The question may require a numerical answer, in which case the value is simply a constant (e.g., a number) and the description a textual description of the system variable, question or constant. Alternatively, the question may be one in which an appropriate response must be selected from a predetermined list of potential answers. The value thereof would then be a value selected from a list and the description thereof would be a description of the value from the list.

The Type column 320 in the conditions table 314 may be configured to support the above-detailed variables and questions. Variables may include system variables or user-defined variables. System variables may be used if a system variable drives policy deviation for a business document (such as a contract). For instance, a deviation rule may be defined using a contract amount system variable, such as "if Contract Amount<$1,000,000 then the standard for Payment Terms is 'Net 30'." User-defined variables (e.g., variables that are defined by customers as part of their implementation of the software) may include most any user-defined quantity, such as "Non-Solicitation Remedy," such as used in an exemplary rule "If 'Non-Solicitation Remedy' is >$25K, Then the standard for Termination Days is 30 days." Questions may be used when the standard for determining policy deviation are not amenable to being embedded within the text of a clause. For instance, questions, rather than variables, are appropriate here if a question drives the determination of whether the terms or clauses of a business document should cause a policy deviation for a business document. For instance, if a question "Is the contract category a consulting contract?" is answered with the value "YES", then a deviation rule may be defined such as "if Contract Category='Consulting Contract', then standard for 'Acceptance Period' is 10 days" and any other acceptance period will be identified as a deviation from acceptable enterprise policies for acceptance periods in contracts of this type and generate a deviation entry in the business document deviation report.

As shown at 322, in the Name column, the user may select from a List Of Values (LOV) based on the Type chosen at 320 (i.e., variable or question). For variables, a LOV search page may be provided to enable the user to select from pre-seeded system variables and all user-defined variables. For questions, a LOV search page may be provided for predefined questions. To further define the rule, an operator may be selected, to test the value or evaluate the condition presented by the rule. In the Operator (logic operator) column 324, the user may provide the logic in defining a condition. For instance, the operator may be the "IS" or the "IS NOT" operators, such as used, for example, in the statements "Payment terms 'IS' Net 30" or "Customer Type 'IS NOT' Government." Embodiments of the present invention support the use of multiple operators to create policy deviation rules. Such operators may include, for example, logic condition operators (including, for example, IS, IS NOT, IN (allows assigning multiple values), NOT IN (allows assigning multiple values), Numeric Condition operators (including, for example, >=(Greater than or equal to), <=(Lesser than or equal to),=(Equal to),≠(Not equal to), >(Greater than), <(Lesser than)). Other operators may be used, as those of skill in this art may appreciate.

The Value column 326 may be provided in the conditions table 312 to enable the user to pick the appropriate value for which the condition is to be evaluated. Users may pick a value in this column only for the 'IS' and 'IS NOT' logic operators. The Update Values column 328 enables users to pick multiple values for the IN and NOT IN logic operators. The Update Values column may enable users to pick numeric values. For numeric operators, users may pick constants. Multiple values may be disallowed for numeric conditions.

The Remove column 330 in the condition table 314 enables a user to delete a condition from a deviation rule. Policy deviation rules, according to embodiments of the present invention may be formatted to include a single condition or multiple conditions. Each condition of a policy deviation rule may occupy a single row, one condition to a row. To add a new condition to a row, the button 332 may be selected by the user. To help insure the integrity of each of the constituent conditions of a policy deviation rule, users may be prevented from clicking the 'Add Another Row' button 332 when the information on the current row is incomplete. Policy or deviation rules may be user-defined as described and shown herein or may be otherwise defined and shown, without departing from the scope of the embodiments shown, described and claimed herein.

Having thus defined a new policy deviation rule or modified an existing policy deviation rule using the input structure described above, the created or modified policy deviation rule may be assigned, applied or associated to one or more business document templates. The created or modified policy deviation rules may then be applied to the templates to which they have been applied or assigned, as called for in step S24 of FIG. 2. Indeed, users may assign a policy deviation rule to one, many or all business document templates. If the created deviation rule is to be applied to globally all templates, the "Apply to All Templates" checkbox 336 would be checked. Alternatively, if the created policy deviation rule is to be applied to a single template or to selected business document templates, the Add Template button 328 may be selected.

Selecting the 'Add Template' button 338 may bring the user to a template search page. The template search page may be configured to enable the user to provide search criteria to enable him or her to select those templates to which the created or modified deviation rule is to be applied or assigned. For example, the template search page may provide the user with a multiple-select LOV page containing, for example, the name of the template or a description thereof. Users may be provided with the ability to perform a blind search using wild card character such as "%", for example. The search results may be filtered based on intent (e.g., Buy or Sell, as described above), organization in which deviation rule is created, business document expert enabled templates only, status (e.g., templates having the draft, rejected, approved, pending approval or revision statuses). The user may be afforded the opportunity to select the desired template or templates to which the deviation rule being created is to be assigned or applied. Such template or templates may be displayed as shown in FIG. 2. As shown the business document template assignment table 334 may include the following columns: multi-select checkbox 340, template name 342, template description 344 and template status 346.

Lastly, the Cancel button 348 allows the user to exit the policy deviation rule create page (FIG. 3) without saving any changes, the Save button 350 directs the system to validate the policy deviation rule created or modified, save the created or modified policy deviation rule and to remain in the same page. If the created deviation rule fails validation, the system would remains in the current page and would provide an appropriate error message. Selecting the Apply button 352 directs the system to validate the created or modified policy deviation rule, save the created or modified data and exit the policy deviation rule creation page. Again, should the policy deviation rule fail validation, the system would remain in the current page and would provide an error message. Selecting the Apply and Add Another button 354 causes the system to validate the created or modified deviation rule and to open a new 'Create Rule' page, as shown in FIG. 2. If the rule fails validation, the system would remain in the current page and would provide an appropriate error message. The user may be pointed to the appropriate portion of the deviation rule that caused the system to fail to validate the deviation rule, to enable the user to remedy the problem.

A status field 310 may be auto-generated by the system, to indicate the status of the rule being created and/or modified. A rule may be assigned the following statuses: Draft, which is the status of a rule when it is being created or updated; Active, which is the status of a deviation rule when the deviation rule has been published and is available for use in an application incorporating an embodiment of the present invention, and Disabled, which is the status of a deviation rule when the deviation rule has been disabled (by the user, for example). Other statuses are possible.

FIG. 4 shows a portion of an exemplary business document deviation report 400, according to an embodiment of the present invention. This report 400 may be generated onscreen and/or may be formatted for printing to e.g., paper or to a PDF document. This business document deviation report 400 details the policy deviations for an exemplary Purchase Order 13401. That is, this business document deviation report was generated following the application of the plurality of deviation rules applied with or assigned to the template on which the Purchase Order 13401 is based. The business document deviation report 400 may include, for example a policy deviations table 410, although embodiments of the present invention are not to be limited by such format. The Policy Deviations table 410 may display the deviation 412, a description 414 of the deviation, a document line number 416 in which the deviation appears, an item column 418 (which may be the items being bought) and an item description column 420 (which may include a description of the item being bought). The current value for the variable/question used in the deviation rule may be displayed from the business document. The deviations identified in column 412 may be hyperlinked to enable the user to display the conditions that caused the deviation to occur. For example, the user may click on the Payment Terms Deviation row in table 410 to display the details of the deviation, as suggested at 422. As a result, a page 500 such as shown in FIG. 5 may be displayed, to provide the user with the details of the non-conformity.

Figure 5:
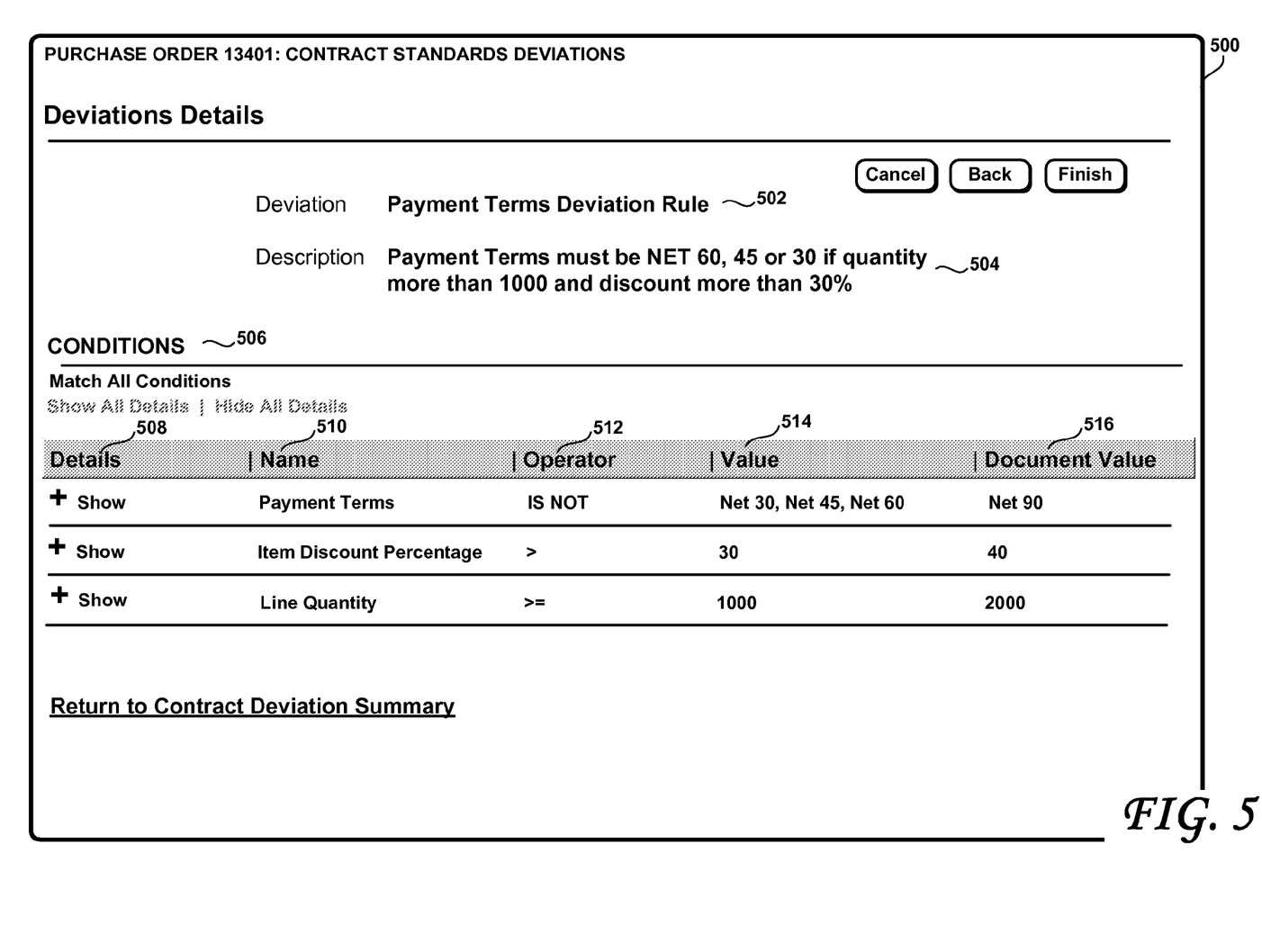
FIG. 5 shows another example of a business document deviation report, according to an embodiment of the present invention.

As shown in FIG. 5, the deviation details page of the generated policy deviations report may include the deviation name 502—in this case, "Payment Terms Deviation Rule" and a description thereof, as shown at 504. The Conditions table 506 may display a Details column 508 to enable the user to display the values for the condition rows if they contain multiple values, a Name column 510 to display the variable name or the question prompt that was used in the condition, an Operator column 512, a Value Column 514 that may indicate a single value if the condition only had one value or display the first 2 or 3 values, and a Document Value column 516 to display the value of the variable/question's response from the business document or other business document on which the deviation rules were run. In the example shown in FIGS. 4 and 5, the payment terms of the purchase order violated the company's stated policies for purchase orders of the type exemplified by Purchase Order 13401, as codified by the deviation rules. As shown in FIG. 5, the payment terms in Purchase Order 13401 were 90 days, whereas the permissible payment terms were limited to Net 30, 45 or 60. Therefore, the deviation rules applied to this business document reported the payment business document terms of the Purchase Order as being non-conforming. Likewise, the deviation rules assigned or applied to the template from which Purchase Order 13401 was generated state that the item discount percentage cannot exceed 30%, whereas Purchase Order 13401 included a 40% discount, thereby triggering the Item Discount Percentage deviation rule, as shown in the second row of the Conditions table 506 in FIG. 5. Lastly, the maximum permissible line quantity, according to the Line Quantity deviation rule is 1000, whereas Purchase Order 13401 listed the line quantity as being 2000. Depending upon internal company procedures, some or all of the items may need to be changed before the business document is allowed to be executed and bind the customer and the company. Alternatively, a business documents administrator or other person having the requisite authority may override the reported business document violations and allow this business document to be executed. In this regard, each enterprise will set up its own procedures for resolving the violations reported by running embodiments of the present inventions against their business documents or other business documents. It should be noted that the present inventions are not limited to the embodiments shown and described herein. For example, it is understood that the deviation report of FIGS. 4 and 5 may be organized differently than shown therein, and/or include other information related to the application of the deviation rules to the business document terms of a business document, without departing from the scope of the present inventions.

Figure 6:
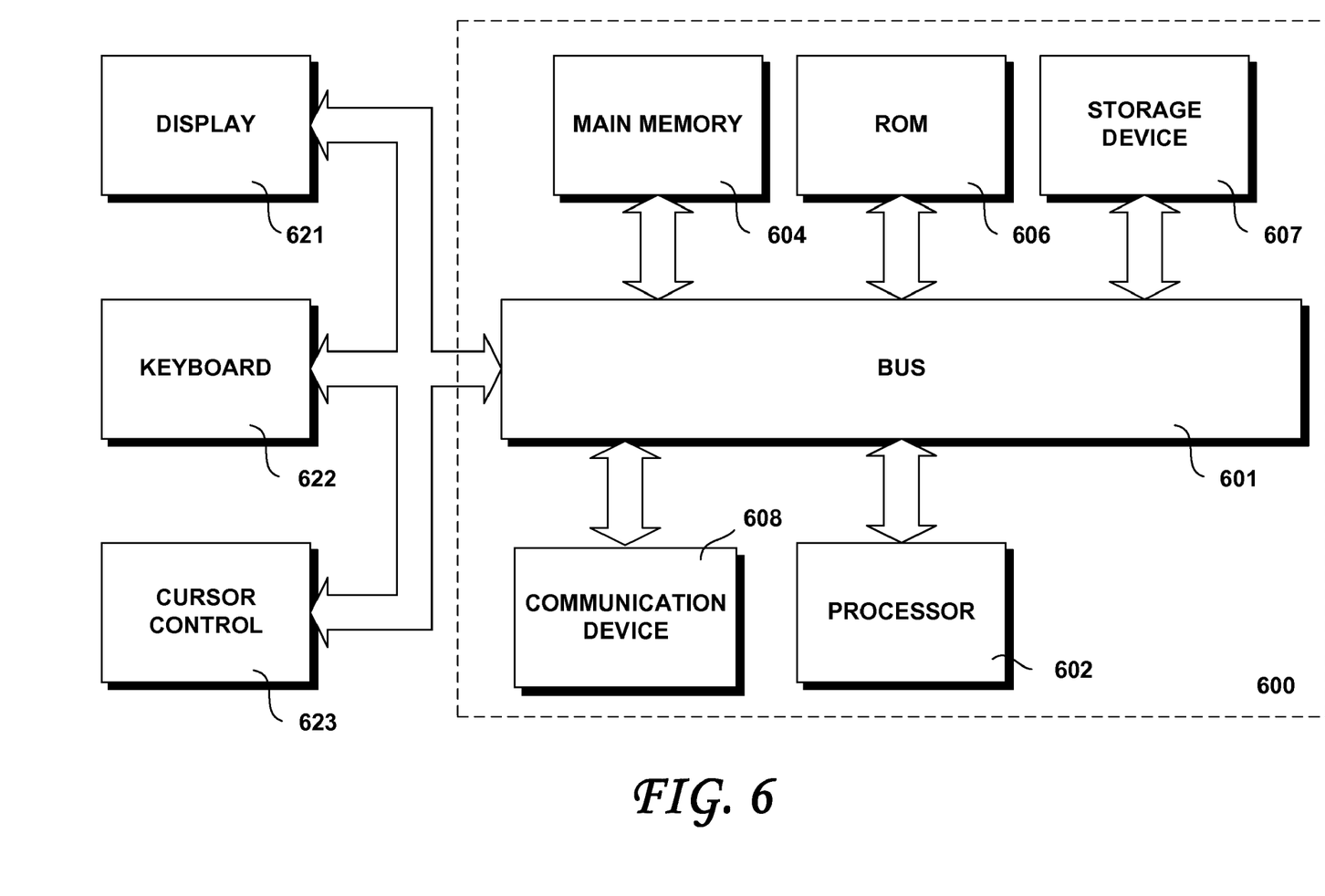
FIG. 6 is shows an exemplary computer suitable for carrying out embodiments of the present inventions.

FIG. 6 illustrates a block diagram of a computer system 600 with which embodiments of the present inventions may be implemented. Computer system 600 includes a bus 601 or other communication mechanism for communicating information, and one or more processors 602 coupled with bus 601 for processing information. Computer system 600 further comprises a random access memory (RAM) or other dynamic storage device 604 (referred to as main memory), coupled to bus 601 for storing information and instructions to be executed by processor(s) 602. Main memory 604 also may be used for storing temporary variables or other intermediate information during execution of instructions by processor 602. Computer system 600 also includes a read only memory (ROM) and/or other static storage device 606 coupled to bus 601 for storing static information and instructions for processor 602. A data storage device 607, such as a magnetic disk or optical disk, is coupled to bus 601 for storing information and instructions. The computer system 600 may also be coupled via the bus 601 to a display device 621 for displaying information to a computer user. An alphanumeric input device 622, including alphanumeric and other keys, is typically coupled to bus 601 for communicating information and command selections to processor(s) 602. Another type of user input device is cursor control 623, such as a mouse, a trackball, or cursor direction keys for communicating direction information and command selections to processor 602 and for controlling cursor movement on display 621.

Embodiments of the present invention are related to the use of computer system 600 and/or to a plurality of such computer systems to enable methods and systems for identifying and reporting deviations from established policies in business documents of an enterprise. According to one embodiment, the methods for identifying and reporting deviations from established policies in business documents of an enterprise described herein may be provided by one or more computer systems 600 in response to processor(s) 602 executing sequences of instructions contained in memory 604. Such instructions may be read into memory 604 from another computer-readable medium, such as data storage device 607. Execution of the sequences of instructions contained in memory 604 causes' processor(s) 602 to perform the steps and have the functionality described herein. In alternative embodiments, hard-wired circuitry may be used in place of or in combination with software instructions to implement the present invention. Within the context of this document, a 'computer-readable medium' may be or include any means that can contain, store, communicate, propagate or transport a program or application that implements an embodiment of the present invention for use by or in connection with a computerized system, apparatus, or device. Indeed, the computer readable medium may be or include (but is not limited to), for example, an electronic, magnetic, optical, electromagnetic, infrared, or semi-conductor system, apparatus, device, or propagation medium. More specific examples (a non-exhaustive list) of computer-readable media would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (such as a CD or DVD-ROM, for example).

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A non-transitory machine-readable medium having data stored thereon representing sequences of machine-executable instructions for identifying and reporting deviations in customized business documents from standards and policies of organizations, the machine-readable medium comprising:

instructions for receiving a plurality of business document templates;

instructions for providing information configured to generate a graphical user interface that enables a user of the graphical user interface to define a plurality of deviation rules configured to codify one or more standards or policies of an organization and that enables the user to associate at least some of the plurality of deviation rules with each business document template in the plurality of business document templates, the graphical user interface configured to receive from the user information specifying one or more conditions for each deviation rule in the plurality of deviation rules that define when business document terms in customized business documents generated based on the plurality of business document templates do not conform to the one or more standards or policies of the organization, the graphical user interface further configured to receive from the user information associating at least some of the deviation rules in the plurality of deviation rules with at least one of the plurality of business document templates;

instructions for storing the plurality of business document templates and the associated plurality of deviation rules, each of the plurality of business document templates having a plurality of business document generation rules;

instructions for receiving a customized business document generated based upon one of the stored plurality of business document templates, the generated customized business document including a selection of plurality of clauses and business document terms based at least in part from evaluating the plurality of business document generation rules in the one of the stored plurality of business document templates;

instructions for retrieving one or more of the stored deviation rules associated with the business document template upon which the customized business document is based and applying the retrieved one or more deviation rules against the generated customized business document;

instructions for identifying all business document terms of the customized business document that do not conform to the one or more standards or policies of the organization based on the application of the retrieved one or more deviation rules; and instructions for generating a report that includes at least the identified non-conforming business document terms.

2. The non-transitory machine-readable medium of claim 1, wherein the instructions for generating the report is carried out with the report also including a listing of any of the retrieved one or more deviation rules that were violated by the identified non-conforming business document terms.

3. The non-transitory machine-readable medium of claim 1, wherein the instructions for generating the report is carried out with the report also including a description of any of the retrieved one or more deviation rules that were violated by the identified non-conforming business document terms.

4. The non-transitory machine-readable medium of claim 1, wherein the instruction for generating the report is carried out with the report further including details regarding how at least one of the identified non-conforming business document terms failed to conform to the one or more standards or policies of the organization based on the application of the retrieved one or more deviation rules that were violated by the identified non-conforming business document terms.

5. The non-transitory machine-readable medium of claim 1, wherein the instructions for generating the report is carried out with the report further including an identification of any clauses of the plurality of clauses of the generated business document that include the identified non-conforming business document terms.

6. The non-transitory machine-readable medium of claim 1, further including instructions for defining a new deviation rule, and applying the newly defined deviation rule with at least one of the plurality of business document templates.

7. The non-transitory machine-readable medium of claim 1, wherein at least one of the retrieved one or more deviation rules defines an allowed value, threshold or range of a variable and wherein the at least one deviation rule identifies a business term as non-conforming when the business term contains a value for a variable that is different than the allowed value, beyond the threshold or outside of the range.

8. The non-transitory machine-readable medium of claim 7, wherein at least one of the retrieved one or more deviation rules includes at least one operator selected from the group consisting of IS, IS NOT, IN, NOT IN, >=, <=, >, <, =and ≠.

9. The non-transitory machine-readable medium of claim 1, wherein the instruction for generating the report is carried out with the report also including at least one line number in the customized business document where the non-conforming business term appears.

10. The non-transitory machine-readable medium of claim 1, further comprising instructions for generating a notification requiring that identified non-conforming business document terms be brought into conformity before the customized business document is executed.

11. The non-transitory machine-readable medium of claim 1, further comprising instructions for generating a notification requiring that the customized business document that includes the non-conforming business document terms go through an approvals process before the business document is executed.

12. The non-transitory machine-readable medium of claim 1, wherein the instructions for generating the report is carried out with the customized business document being one of a contract, a quote, an agreement, a memorandum, a license and a purchase order.

13. The non-transitory machine-readable medium of claim 1, wherein at least one of the retrieved one or more deviation rules specifies a list of approvers that must approve the customized business document before the business document is executed.

14. A computer-implemented method for identifying and reporting deviations in customized business documents from standards and policies of organizations, comprising:

receiving, at one or more computer systems, a plurality of business document templates;

providing, with the one or more computer systems, information configured to display a graphical user interface on a display device that enables a user of the graphical user interface to define a plurality of deviation rules configured to codify one or more standards or policies of an organization and that enables the user to associate at least some of the plurality of deviation rules with each business document template in the plurality of business document templates, the graphical user interface configured to receive from the user information specifying one or more conditions for each deviation rule in the plurality of deviation rules that define when business document terms in customized business documents generated based on the plurality of business document templates do not conform to the one or more standards or policies of the organization, the graphical user interface further configured to receive from the user information associating at least some of the deviation rules in the plurality of deviation rules with at least one of the plurality of business document templates;

storing the plurality of business document templates and the associated plurality of deviation rules in a database associated with the one or more computer systems, each of the plurality of business document templates having a plurality of business document generation rules;

receiving, at the one or more computer systems, a customized business document generated based upon one of the stored plurality of business document templates, the generated customized business document including a selection of plurality of clauses and business document terms based at least in part from evaluating the plurality of business document generation rules in the one of the stored plurality of business document templates;

retrieving, with the one or more computer systems, one or more deviation rules associated with the business document template upon which the customized business document is based from the database associated with the one or more computer systems and applying the retrieved one or more deviation rules against the generated customized business document;

identifying, with one or more processors associated with the one or more computer systems, all business document terms of the customized business document that do not conform to the one or more standards or policies of the organization based on the application of the retrieved one or more deviation rules; and generating, with the one or more processors associated with the one or more computer systems, a report that includes at least the identified non-conforming business document terms.

15. A computer system for identifying and reporting deviations in customized business documents from standards and policies of organizations, comprising:
- at least one processor;
- at least one data storage device coupled to the at least one processor;
- a plurality of processes spawned by said at least one processor, the processes including processing logic for:
  - receiving a plurality of business document templates;
  - providing information configured to display a graphical user interface on a display device that enables a user of the graphical user interface to define a plurality of deviation rules configured to codify one or more standards or policies of an organization and that enables the user to associate at least some of the plurality of deviation rules with each business document template in the plurality of business document templates, the graphical user interface configured to receive from the user information specifying one or more conditions for each deviation rule in the plurality of deviation rules that define when business document terms in customized business documents generated based on the plurality of business document templates do not conform to the one or more standards or policies of the organization, the graphical user interface further configured to receive from the user information associating at least some of the deviation rules in the plurality of deviation rules with at least one of the plurality of business document templates;
  - storing the plurality of business document templates and the associated plurality of deviation rules, each of the plurality of business document templates having a plurality of business document generation rules;
  - receiving a customized business document generated based upon one of the stored plurality of business document templates, the generated customized business document including a selection of plurality of clauses and business document terms based at least in part from evaluating the plurality of business document generation rules in the one of the stored plurality of business document templates;
  - retrieving one or more stored deviation rules associated with the business document template upon which the customized business document is based and applying the retrieved one or more deviation rules against the generated customized business document;
  - identifying all business document terms of the customized business document that do not conform to the one or more standards or policies of the organization based on the application of the retrieved one or more deviation rules; and
  - generating a report that includes at least the identified non-conforming business document terms.

* * * * *

UNITED STATES PATENT AND TRADEMARK OFFICE
CERTIFICATE OF CORRECTION

| | | |
|---|---|---|
| PATENT NO. | : 8,037,004 B2 | Page 1 of 1 |
| APPLICATION NO. | : 11/761338 | |
| DATED | : October 11, 2011 | |
| INVENTOR(S) | : Rajkumar et al. | |

It is certified that error appears in the above-identified patent and that said Letters Patent is hereby corrected as shown below:

On the Title Pg, Item (75), under "Inventors", line 7, delete "John Kodlyan," and insert -- John Kodiyan, --, therefor.

On sheet 2 of 6, in figure 2, Box No. S25, line 3, delete "OF MORE" and insert -- OR MORE --, therefor.

In column 9, line 50-51, delete "settlement"" and insert -- settlement". --, therefor.

Signed and Sealed this
Twenty-seventh Day of December, 2011

David J. Kappos
*Director of the United States Patent and Trademark Office*